(Model.)

J. D. FRARY.
TABLE CUTLERY.

No. 341,415. Patented May 4, 1886.

Witnesses

James D. Frary
Inventor
By Atty

UNITED STATES PATENT OFFICE.

JAMES D. FRARY, OF BRIDGEPORT, CONNECTICUT, ASSIGNOR TO THE JOHN RUSSELL CUTLERY COMPANY, OF TURNER'S FALLS, MASS.

TABLE-CUTLERY.

SPECIFICATION forming part of Letters Patent No. 341,415, dated May 4, 1886.

Application filed March 9, 1885. Serial No. 158,126. (Model.)

*To all whom it may concern:*

Be it known that I, JAMES D. FRARY, of Bridgeport, in the county of Fairfield and State of Connecticut, have invented a new Improvement in Table-Cutlery; and I do hereby declare the following, when taken in connection with accompanying drawings and the letters of reference marked thereon, to be a full, clear, and exact description of the same, and which said drawings constitute part of this specification, and represent, in—

Figure 1:
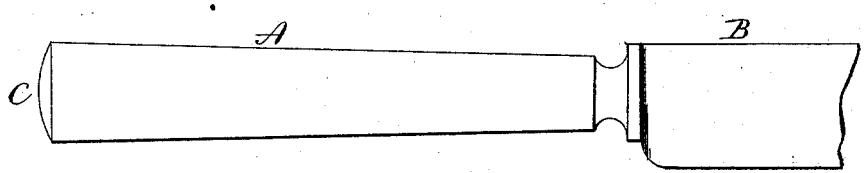
Figure 2:
Figure 3:
Figure 4:
Figure 5:

Figure 1, a side view of a knife, a portion of the blade broken away; Fig. 2, a back view of the same; Fig. 3, a longitudinal central section cutting in a plane at right angles to the plane of the blade; Fig. 4, a transverse section through the handle; Fig. 5, a transverse section showing a modification of the web.

This invention relates to an improvement in that class of table-cutlery in which the handles are made from metal.

Heretofore metal handles for table-cutlery have been made by forming the handle in two parts or blanks cut from sheet metal and struck into shape so that the edges of the two parts will meet in the central plane of the blade, the two parts being soldered together, and also soldered to the bolster. Such construction enables the production of handles of various shapes and ornamentation; but as the metal is necessarily thin they are liable to be bruised, and in such bruising the joint is broken, and permits water to flow into the handle, and as, when once in the handle, it can only leave there by dripping out, it is a source of annoyance to users of such knives. To obviate this difficulty the handles have been cast solid onto the blade; but such handles are so heavy as to be practically discarded in the market. Other metal handles have been forged in the same piece with the blade, and made small and light, so as to overcome the objection of the heavy cast handle; but in such construction the handles are too small to be conveniently used. Again, where an ornamented handle is desirable, the forged handles require first to be finished and then struck in dies to produce ornamentation. This operation is expensive, and does not relieve the handle from the objections to its size. Other classes of handles have been made by drawing up a sheet-metal tube equal in transverse area from the butt to the bolster, the butt-end closed, the other open end soldered to the bolster; but such handles are objectionable from the fact of the necessary shape of equal transverse area throughout, such shape being necessary, because the handles are drawn from sheet metal, in dies.

The recognized best shape for a handle of a table-knife is that usually found in ivory handles, and which tapers slightly from the bolster to the butt, the butt simply rounded, the sides of the handle flat, and the edges rounded, and such as seen in Figs. 1 and 2.

Handles have been cast directly onto the tang hollow or cored, so as to leave the butt-end open, and the butt-end closed by a cap soldered or brazed thereto, and in which the handles are cast from an alloy, or what is commonly called "white-metal." In such metal it is difficult to produce a fine surface by the usual methods of polishing, making such handles as ordinarily produced too expensive for practical work. It is to this class of handles that my invention particularly relates; and it has for its object to consolidate the metal, whereby a fine smooth surface is produced, and which are, if desired, easily ornamented in such consolidation; and the invention consists in casting a tubular handle upon the heel or tang end of the blade upon a metal core, the core extending beyond the butt-end of the handle, and whereby the butt-end of the handle is left open, and then striking the handle between dies while the metal core remains in the handle to form a resistance against the action of the dies, as more fully hereinafter described.

A represents the handle; B, the blade, the outline of the handle being substantially that of the common ivory handle. The handle is cast hollow, with the butt-end open.

A metal mold is first formed having a cavity corresponding to the exterior of the handle, and also a cavity to receive the bolster end of the blade, and so that the blade set into the mold so much of its tang as is necessary for the attachment of the handle will stand within the handle-cavity and receive the bolster portion, as at *a*, Fig. 3. A metal core is prepared for the handle and fixed in the mold so as to stand in the cavity and leave a space around it for the metal to flow to form the handle and onto the blade to form a bolster. Longitudinally through the core is an opening corresponding to a web, *b*, to be formed between the two sides of the handle. The metal is poured into the mold, and, flowing around the core, forms the handle and bolster, and in so flowing the metal unites with the heel end of the blade. The metal also flows through the opening in the core and forms the web *b*, which is longitudinally through the handle, uniting its two sides. This leaves the butt-end of the handle open. After the core is removed the butt end of the handle is closed by a cap, C, which is of convex shape and soldered to the open butt-end of the handle. The cap may be struck from sheet metal, so as to form a strong butt.

The metal employed to form such handles, it will be understood, is what is commonly called "white-metal." As this metal is liable to be porous, or present a somewhat open surface, I strike the handle in dies, in shape corresponding to the finished handle, while the handle is still on the core—that is, when the handle with the core is removed from the mold, instead of immediately withdrawing the core, the handle, with the core still in it, is introduced between dies and struck, which condenses the metal and produces a perfectly smooth surface.

In some classes of handles an ornamental surface is required. In such case the striking or finishing dies have their cavities correspondingly ornamented, and then by striking onto the metal of the handle while it is still supported by the core the handle is finished and ornamented corresponding to the dies, the core forming a firm support for such striking and ornamentation. The core is subsequently removed, and the cap applied to close and finish the butt-end. Then the handles may be electroplated or otherwise finished.

Instead of making the web to extend entirely across the handle from side to side, it may be a rib upon each, as seen in Fig. 5, the ribs in themselves being sufficient to withstand blows or accidents which would otherwise indent the handle. The rounded shape of the edges of the handle serve to resist such indentations, the sides only needing the protection described.

While I prefer to cast the handle with the web as a support for the sides, the web may be omitted.

It will be understood from the foregoing that I do not claim, broadly, a cored metal handle cast directly upon the heel of a blade and with a cap applied to close the open butt-end of the handle.

I claim—

1. The herein-described improvement in handles for table-cutlery, consisting in a metal handle cast directly upon the heel end of the blade, the handle portion cast hollow, the butt-end open, and with a longitudinal web between the two sides, the butt-end closed by a cap to complete the handle, substantially as described.

2. The method herein described for forming and attaching cutlery-handles to the blades, consisting in casting a tubular handle upon the heel end of the blade and upon a metal core, whereby the butt-end of the handle is left open, and then striking the handle between dies while the core still remains in the handle, substantially as described.

JAMES D. FRARY.

Witnesses:
JOHN E. EARLE,
JOS. C. EARLE.